United States Patent
Hikuma et al.

[11] Patent Number: 6,104,356
[45] Date of Patent: Aug. 15, 2000

[54] DIVERSITY ANTENNA CIRCUIT

[75] Inventors: Hideo Hikuma, Chiba; Toshiaki Yuasa, Higashikatsushika-gun, both of Japan

[73] Assignee: Uniden Corporation, Tokyo, Japan

[21] Appl. No.: 08/704,008

[22] Filed: Aug. 26, 1996

[30] Foreign Application Priority Data

Aug. 25, 1995 [JP] Japan ................................. 7-217633

[51] Int. Cl.⁷ ................................................. H01Q 21/00
[52] U.S. Cl. .......................... 343/853; 343/725; 343/797; 343/852
[58] Field of Search ..................... 343/850, 853, 343/893, 725, 727, 793, 794, 797, 852; H01Q 13/08, 21/24, 21/00

[56] References Cited

U.S. PATENT DOCUMENTS

| | | | |
|---|---|---|---|
| 3,521,284 | 7/1970 | Shelton et al. | 343/853 |
| 4,434,425 | 2/1984 | Barbano | 343/797 |
| 4,890,118 | 12/1989 | Hudspeth et al. | 343/786 |
| 5,208,602 | 5/1993 | Monser et al. | 343/797 |
| 5,294,939 | 3/1994 | Sanford et al. | 343/853 |
| 5,486,836 | 1/1996 | Kuffner et al. | 343/702 |
| 5,583,511 | 12/1996 | Hukderman | 343/700 |

FOREIGN PATENT DOCUMENTS

| | | | |
|---|---|---|---|
| 0454 585 A1 | 10/1991 | European Pat. Off. . | |
| 51-1109 | 1/1976 | Japan . | |
| 52-63644 | 5/1977 | Japan . | |
| 52-101949 | 8/1977 | Japan . | |
| 58-070642 | 7/1983 | Japan . | |
| 61-1102 | 1/1986 | Japan | H01Q 13/08 |
| 1-183201 | 7/1989 | Japan . | |
| 3-196705 | 8/1991 | Japan | H01Q 21/24 |
| 4-90639 | 1/1992 | Japan | H04Q 11/00 |
| 4-90640 | 3/1992 | Japan | H04J 11/00 |
| 4-304719 | 10/1992 | Japan . | |
| 05-160814 | 6/1993 | Japan . | |
| 5-219007 | 8/1993 | Japan | H04J 11/00 |
| 6-232601 | 8/1994 | Japan . | |
| 06-260955 | 9/1994 | Japan . | |
| 06-334565 | 12/1994 | Japan . | |
| 7-176942 | 7/1995 | Japan . | |
| 7-183725 | 7/1995 | Japan . | |

OTHER PUBLICATIONS

R. J. Chignell et al., "Antenna Systems for ESM Applications–Land–Mobile Example," Jul. 1985, pp. 252–256.

Primary Examiner—Hoanganh T. Le
Assistant Examiner—Tho Phan
Attorney, Agent, or Firm—McDermott, Will & Emery

[57] ABSTRACT

The diversity antenna circuit comprises a first antenna for receiving a vertical plane of polarization of an electric wave, a second antenna for receiving a horizontal plane of polarization thereof, a receiving means for detecting the electric field strength of a received signal, a first matching means for matching the first antenna to the receiving means, a second matching means for matching the second antenna to the receiving means, a first transfer means, a second transfer means, a first switching means, a second switching means, and a switching control means for connecting one of the first and second antennas to the receiving means and separating another one from the receiving means according to ON/OFF control of the first and second switching means based on received electric field strength.

10 Claims, 5 Drawing Sheets

DIVERSITY ANTENNA CIRCUIT

FIELD OF THE INVENTION

The present invention relates to a diversity antenna circuit which receives signals with two units of antenna and uses the received signals for switching them, and more particularly to a diversity antenna circuit which suppresses mutual interference in each antenna's reception and thus allows selection or switching to the antenna having higher receiving sensitivity.

BACKGROUND OF THE INVENTION

In mobile communications, a plurality of paths is generated when a transmitted electric wave propagates through space and the plurality of paths interfere each other at a receiving terminal and the received electric field strength fluctuates from time to time, and this phenomenon is called fading. Commonly, a propagation path in land mobile communications becomes a multi-path propagation path, and so called the fading occurs in which envelope and phase of a received wave fluctuate according to the law of Rayleigh distribution and the law of homogeneous distribution, respectively.

As a technique for alleviating the effects of fading, there is a technology called diversity. This is a technology to reduce fluctuation in propagation by preparing a plurality of receiving branches making use of the phenomenon that fluctuation in propagation varies according to a position in space or a frequency and synthesizing or switching received power in each of the antenna units. For instance, the technology in which a plurality of receiving systems having no correlation concerning the receiving points are provided is called space diversity, the technology in which a plurality of receiving systems having no correlation concerning the frequencies is called frequency diversity, and the technology in which a plurality of receiving systems having no correlation concerning the planes of polarization is called polarization diversity.

On the other hand, as an antenna for a mobile station in mobile communications, omnibearing is required for the horizontal plane so that a receiving level will not change according to the difference in a direction in which an electric wave arrives, also, a beam faces the substantially horizontal direction because an electric wave arrives in the substantially the horizontal direction, that the construction should be rigid, and that the form of the antenna is well harmonized with external appearance of the mobile body. Conventionally there have been used, as representative antennas for mobile stations, a uni-pole antenna based on simple construction, a sleeve antenna little affected by a conductive plate and having excellent directivity, a ⅝ wavelength antenna, a reversed F-shaped antenna which is compact and well suited to incorporation in a portable unit, or the like.

However in the conventional type of antennas for a mobile station, it is impossible to take adequate countermeasures against fading described above, and also in an antenna for a mobile station in mobile communications, it has been desired to introduce the diversity technology as a technology for alleviating effects by fading.

SUMMARY OF THE INVENTION

It is an object of the present invention to provide a diversity antenna circuit of polarized diversity in which a plurality of receiving systems having no correlation in the planes of polarization are provided and fluctuation in propagation is reduced by switching, for instance, received power for each of the antenna units, said diversity antenna suppressing mutual interference in reception by each receiving system and enabling accurate selection of and switching to a receiving system of high receiving sensitivity.

It is another object of the present invention to provide a diversity antenna circuit which can be used as an antenna for a mobile station such as a portable telephone required for the size to be minimized as much as possible and is suited to incorporation in a portable unit.

With the diversity antenna circuit according to the present invention, two receiving systems having no correlation between each other about a plane of polarization are provided therein. Fluctuation during propagation of electric wave is reduced by switching electric power received thereby with a switching means. More specifically, a plane of vertical polarization of electric wave is mainly received by the first antenna, and a plane of horizontal polarization of electric wave is mainly received by the second antenna. The electric field strength of a received signal received by the first antenna and second antenna is detected by the receiving means. One end of the first antenna and second antenna each is connected to the receiving means by ON or OFF control of the first switching means and the second switching means based on the electric field strength in the switching control means. The receiving means is separated from the other end of the first antenna and second antenna. Impedance matching between the first antenna and the receiving means is executed by the first matching means, and impedance matching between the second antenna and the receiving means is executed by the second matching means. A diversity antenna circuit in which interference between each other in each of receiving operations can thereby be suppressed. Accurate selection of the antenna having higher receiving sensitivity and switching to that antenna are thus provided.

Other objects and features of this invention will become understood from the following description with reference to the accompanying drawings.

BRIEF DESCRIPTION OF THE DRAWINGS

FIGS. 5A and 5B depict two packaged pattern views each showing the diversity antenna circuit according to the embodiment (FIG. 5A is a pattern view showing a surface of the packaged pattern thereof.

DETAILED DESCRIPTION OF THE PREFERRED EMBODIMENTS

Detailed description is made hereinafter for an outline as well as an embodiment of the diversity antenna circuit according to the present invention with reference to the related drawings.

Figure 1:
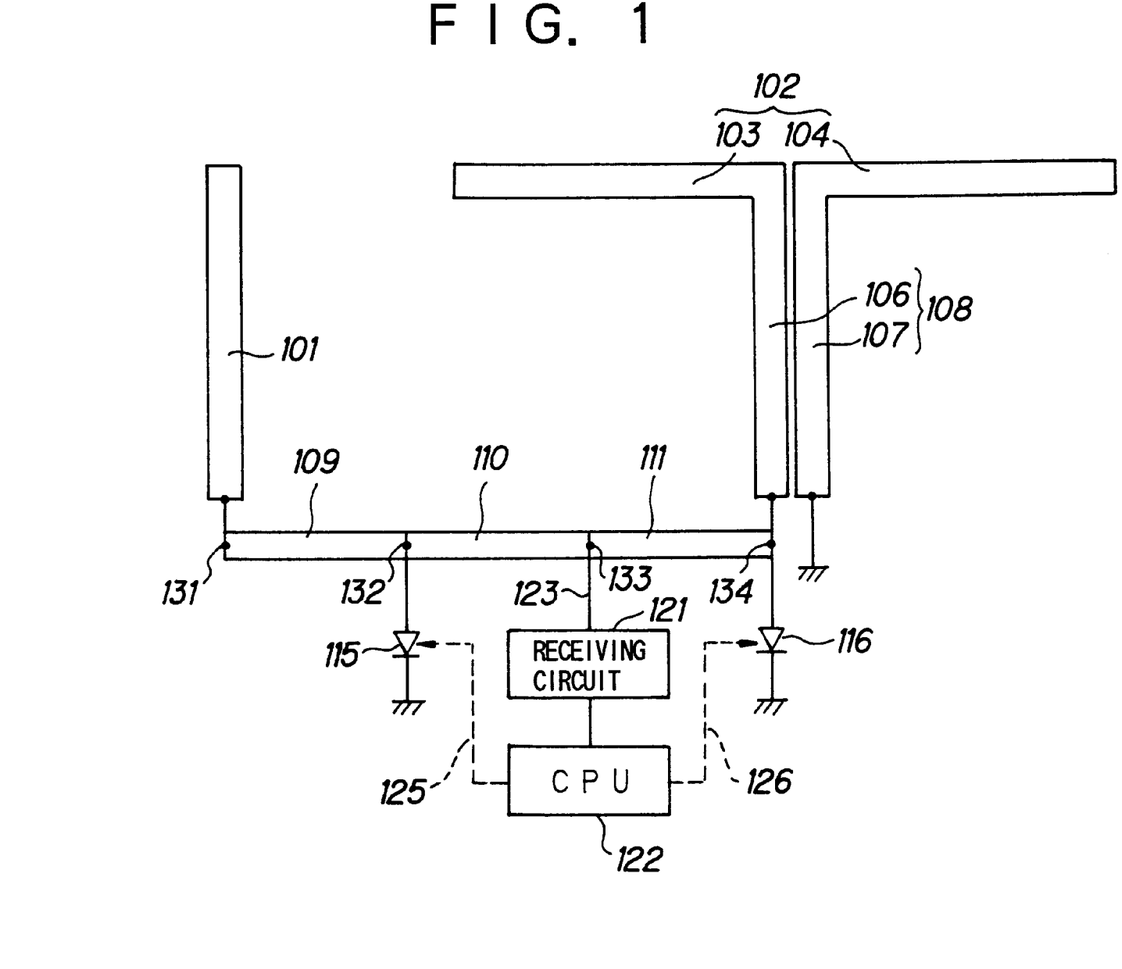
FIG. 1 is a block diagram showing a diversity antenna circuit according to an embodiment of the present invention.

In the diversity antenna circuit according to a first feature of the present invention, as shown in FIG. 1, a vertical plane of polarization of an electric wave is mainly received by a first antenna 101, a horizontal plane of polarization of an electric wave is mainly received by a second antenna 102, an electric field strength of the signal received by the first antenna 101 or second antenna 102 is detected by a receiving means 121, and in a switching means 122, the receiving means 121 is connected to either one of the first antenna 101 or second antenna 102 and the other of the first antenna 101 and second antenna 102 is separated from the receiving means according to ON control or OFF control provided by a first switching means 116 as well as by a second switching means based on the electric field strength.

It should be noted that impedance matching between the first antenna 101 and the receiving means 121 is executed by a first matching means 109, and impedance matching between the second antenna 102 and the receiving means 121 is executed by the second matching means 108.

In polarization diversity in which two receiving systems having no correlation concerning a plane of polarization are provided and fluctuation in propagation of electric wave is reduced by switching received powers in the two receiving systems with a switching control means, by introducing the configuration as described above, it is possible to realize a diversity antenna circuit which can suppress mutual interference in a receiving operation in each receiving system and can select one of the receiving systems having higher receiving sensitivity.

Also in the diversity antenna circuit according to a second feature of the present invention, it is preferable that, as shown in FIG. 1, the first antenna 101 is a ¼ wavelength whip antenna installed in the vertical direction, the second antenna 102 is a half- wavelength dipole antenna installed in the horizontal direction and including a ¼ wavelength first conductor section 103 and a ¼ wavelength second conductor 104. The first matching means 109 is preferably a ¼ wavelength first strip line having one edge thereof connected to a feeding point of the ¼ wavelength whip antenna 101, the second matching means 108 is a ¼ wavelength feeder line comprising two lines in parallel to each other and including the first feeder line section 106 having the other edge thereof connected to a feeding point of the ¼ wavelength first conductor section 103 and the second feeder line section 107 having the other end thereof connected to a feeding point of the ¼ wavelength second feeder section 104. The first transfer means 110 is a ¼ wavelength second strip line having the other end thereof connected to the ¼ wavelength first strip line 109, and the second transfer means 111 is a ¼ wavelength third strip line having the other end thereof connected to the first feeder line section 106 or the second feeder line section 107.

With this configuration described above, a vertical plane of polarization of electric wave is received by the ¼ wavelength whip antenna 101, and a horizontal plane of polarization of electric wave is received by the half-wavelength dipole antenna 102, so that the one having higher receiving sensitivity can accurately be selected and switched thereto by the switching control means 122. Impedance matching between the first antenna as well as the second antenna and the receiving means 121 is accurately executed by the first matching means 109 and the second matching means 108. When the first antenna 101 or the second antenna 102 is separated from the receiving means 121, impedance at the feeding point of the first antenna 101 or the second antenna 102 can be made higher, and for this reason mutual interference in the receiving operation in each of the receiving systems can be suppressed.

Also, by introducing a first transfer means 110 comprising a ¼ wavelength second strip line and a second transfer means 111 comprising a ¼ waveform third strip line, flexible circuit designing such as setting said strip lines so that a capacity component or an induction component or the like due to elements realizing a first switching means 115 and second switching means 116 are accommodated by the ¼ wavelength second strip line 110 and ¼ wavelength third strip line 111 becomes possible. This makes it possible to realize a diversity antenna circuit having excellent characteristics which can reduce loss when connected or disconnected.

In the diversity antenna circuit according to a third feature of the present invention, as shown in FIG. 1, when it is determined that electric field strength of a signal received by the first antenna 101 is higher than that by the second antenna 102, the first switching means 115 is turned OFF and the second switching means 116 is turned ON by a switching control means 122. When it is determined that the electric field strength of a signal received by the second antenna 102 is higher than that by the first antenna 101, however, the first switching means 115 is turned ON and the second switching means 116 is turned OFF.

With this feature, when it is determined that the electric field strength received by the first antenna 101 is higher, then a receiving system based on the second antenna 102 is disconnected and a receiving system based on the first antenna 101 is connected for receiving operation by the receiving system to be executed. When it is determined that the electric field strength received by the second antenna 102 is higher, the receiving system based on the first antenna 101 is disconnected and the receiving system based on the second antenna 102 is connected.

Also, in the diversity antenna circuit according to a fourth feature of the present invention, as shown in FIG. 1, a connection point 131 between the first antenna 101 and the first matching means 109 is connected to or disconnected from a connection point 133 between the first transfer means 110 and the receiving means 121 according to ON or OFF control provided by the first switching means 115. A connection point between the second antenna 102 and the second matching means 108 is connected to or disconnected from a connection point 133 between the second transfer means 111 and the receiving means 121 according to ON control or OFF control provided by the switching means 116.

Specifically, according to ON/OFF control by the first switching means 115, the end of the first matching means 109 not connected to the first antenna 101 is shorted or opened to control, a connection point between the first antenna 101 and the first matching means 109. Namely, a feeding point of the first antenna 101 is opened or shorted, and also according to ON/OFF control by the second switching means 116, another end of the second matching means 108 not connected to the second antenna 102 is shorted or opened, and a connection point between the second antenna 102 and the second matching means 108, namely a feeding point of the second antenna 102 is opened or shorted. It is thus possible to realize a diversity antenna circuit in which selection or switching of a receiving system can accurately be executed by the switching control means 122 and also loss in connection or disconnection can be reduced.

Figure 5A:
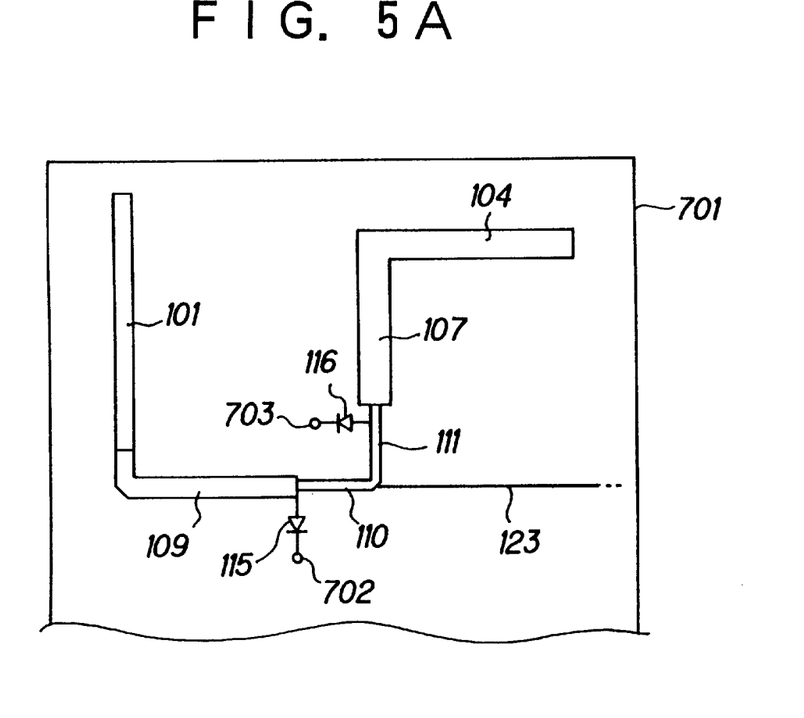
Figure 5B:
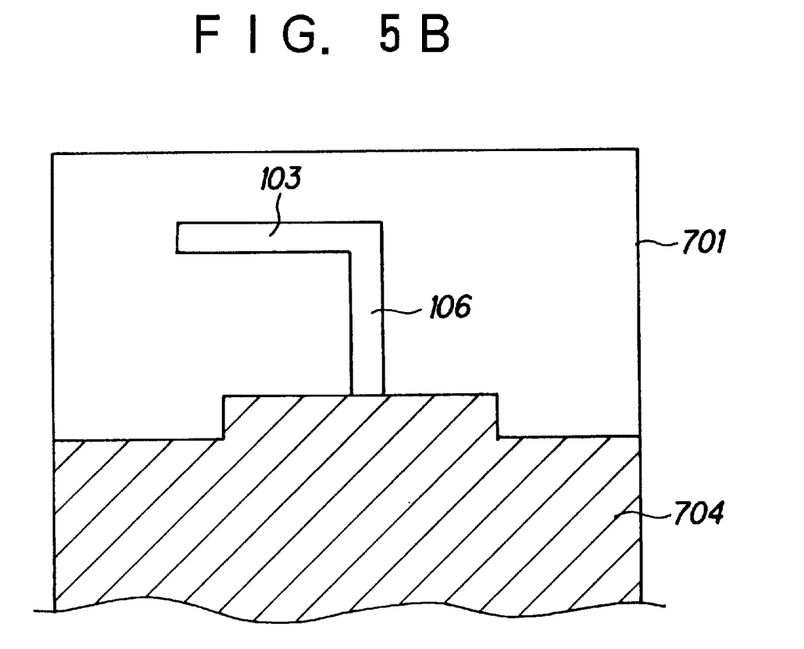
FIG. 5B is a pattern view showing a rear surface thereof).

Furthermore, in the diversity antenna circuit according to a fifth feature of the present invention, as shown in FIG. 5, the diversity antenna circuit is packaged on a substrate, and the ¼ wavelength first conductor section 103 as well as the first feeder line section 106 and the ¼ wavelength second conductor section 104 as well as the second feeder line section 107 are packaged in different layers formed on the substrate.

As described above, by packaging a diversity antenna circuit on a circuit board, it can be used as an antenna for a mobile station, such as a portable telephone, for which a high degree of miniaturization is required, and a diversity antenna circuit suited to incorporation in a portable unit can be realized. Also by packaging a half-wavelength dipole antenna 102 and the ¼ wavelength feeder line 108 comprising 2 lines in parallel to each other in different layers formed on the substrate, it becomes possible to make an element width larger and also to reduce loss. For this reason, a diversity antenna circuit, which has excellent performance in a broader frequency band area, can be realized.

FIG. 1 is a block diagram showing the diversity antenna circuit according to an embodiment of the present invention. In the figure, the diversity antenna circuit of the present invention comprises a vertically positioned ¼ wavelength whip antenna 101, a horizontally positioned half-wavelength dipole antenna 102, a ¼ wavelength feeder line 108 comprising two lines in parallel to each other, a ¼ wavelength first strip line 109, a ¼ wavelength second strip line 110, a ¼ wavelength third strip line 111, a ¼ wavelength second strip line 110, a ¼ wavelength third strip line 111, a diode 115, a diode 116, a receiving circuit 121, and a CPU 122.

The vertically positioned ¼ wavelength whip antenna 101 receives mainly a vertical plane of polarization of electric wave. The horizontally positioned half-wavelength dipole antenna 102 comprises a first conductor section 103 and a second conductor section 104, and mainly receives a horizontal plane of polarization of electric wave.

The ¼ wavelength first strip line 109 is for matching impedance of the vertically positioned ¼ wavelength whip antenna 101 to that of the receiving circuit 121. Also the ¼ wavelength feeder line 108 comprising two line in parallel to each other comprises a first feeder line section 106 connected to the first conductor section 103 and a second feeder line section 107 connected to the second conductor section 104, and is for matching impedance of the horizontally positioned half-wavelength dipole antenna 102 to that of the receiving circuit 121.

The ¼ wavelength second strip line 110 transfers a signal received from the vertically positioned ¼ wavelength whip antenna 101 to the receiving circuit 121 and also has a matching function for open/short-controlling a connection point 133 simultaneously when the diode 115 is ON/OFF-controlled. The ¼ wavelength third strip line 111 transfers a signal received from the horizontally positioned half-wavelength dipole antenna 102 to the receiving circuit 121, and also has a matching function for open/short-controlling the connection point 133 simultaneously when the diode 116 is ON/OFF-controlled.

The receiving circuit 121 has at least a function for detecting an electric field strength of a received signal, and the result of detection of the electric field strength is reported to the CPU 122. The CPU 122 determines with which antenna (receiving system) a signal should be received according to the electric field strength of the received signal obtained in the receiving circuit 121, and a bias-control in regular or reverse direction of the diodes 115 and 116 is executed by control signals 125 and 126 respectively.

The CPU 122 provides a reverse-directional bias control for the diode 115 and also provides a regular-directional bias-control for the diode 116 when it is determined that electric field strength of a signal received by the vertically positioned ¼ wavelength whip antenna 101 is higher than that by the horizontally positioned half-wavelength dipole antenna 102 so that a connection point 131 between the vertically positioned ¼ wavelength whip antenna 101 and the ¼ wavelength strip line 109 is shorted and at the same time a connection point between the horizontally positioned half-wavelength dipole antenna 102 and the ¼ wavelength feeder line 108 comprising two lines in parallel to each other is set in the open state.

Also, the CPU 122 provides a regular-directional control for the diode 115 and also provides a reverse-directional bias control for the diode 116 when it is determined that the electric field strength of a signal received by the horizontally positioned half-wavelength dipole antenna 102 is higher than that by the vertically positioned ¼ wavelength whip antenna 101, so that a connection point 131 between the vertically positioned ¼ wavelength whip antenna 101 and the ¼ wavelength first strip line 109 is set in the open state and at the same time a connection point between the horizontally positioned half-wavelength dipole antenna 102 and the ¼ wavelength feeder line 108 comprising two lines in parallel to each other is shorted.

Next, a description is made for features of the vertically positioned ¼ wavelength whip antenna 101 and the horizontally positioned half-wavelength dipole antenna 102.

The diversity antenna circuit of the present embodiment has the configuration of polarization diversity, and two receiving systems of the vertically positioned ¼ wavelength whip antenna 101 and the horizontally positioned half-wavelength dipole antenna 102 are required to have no correlation with each other concerning plane of polarization.

Then, in an equivalent circuit of the diversity antenna circuit shown in FIG. 2, testing is performed for checking the characteristics by means of simulation, assuming location and configuration of the vertically positioned ¼ wavelength whip antenna 101 and the horizontally positioned half-wavelength dipole antenna 102 as follows.

Length of the vertically positioned ¼ wavelength whip antenna 101: L 1=37 [mm]

Diameter of the horizontally positioned ¼ wavelength whip antenna 101: 1 [mm]

Length of the horizontally positioned half-wavelength dipole antenna 102: L 2=71 [mm]

Diameter of the horizontally positioned half-wavelength dipole antenna 102: 1 [mm]

Distance between antennas: D=5 [mm]

Length of the ¼ wavelength feeder line 108 comprising two lines in parallel to each other: L 3=28 [mm]

Figure 2A:
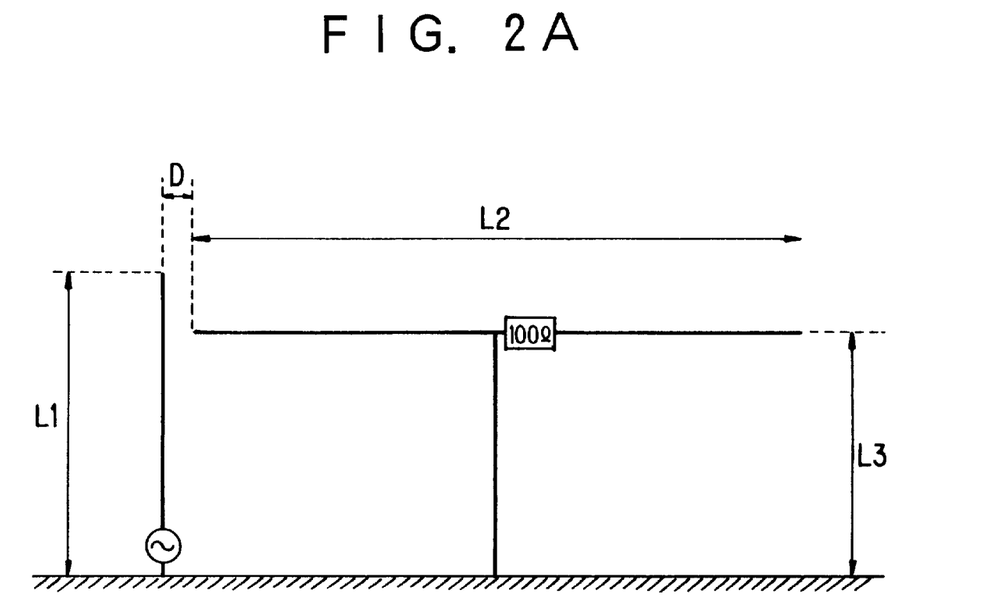
FIG. 2A is a view showing an equivalent circuit in case where a horizontally positioned half-wavelength dipole antenna is separated from the circuit.
Figure 2B:
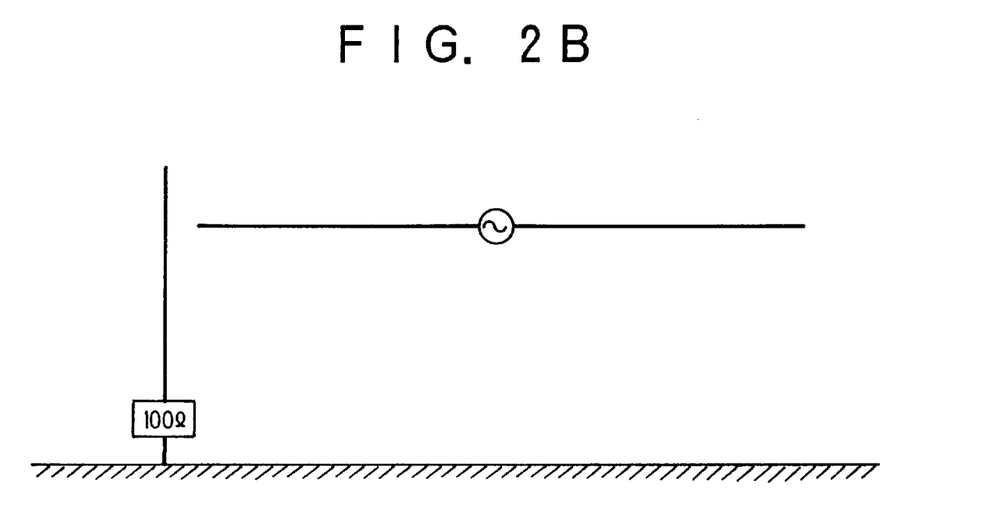
FIG. 2B is a view showing an equivalent circuit in the case where a vertically positioned ¼ wavelength whip antenna is separated from the circuit.

A simulation experiment in equivalent circuits each shown in FIG. 2A and FIG. 2B was carried out with the simulator ELNEC. FIG. 2A is an equivalent circuit in the state where impedance at the feeding point of horizontally positioned half-wavelength dipole antenna 102 is made higher (100 [Ω]) and the antenna is separated from the vertical one, while FIG. 2B is an equivalent circuit in the case where impedance at the feeding point of the vertically positioned ¼ wavelength whip antenna 101 is made higher (100 [Ω]) and the antenna is separated from the horizontal one.

Figure 3A:
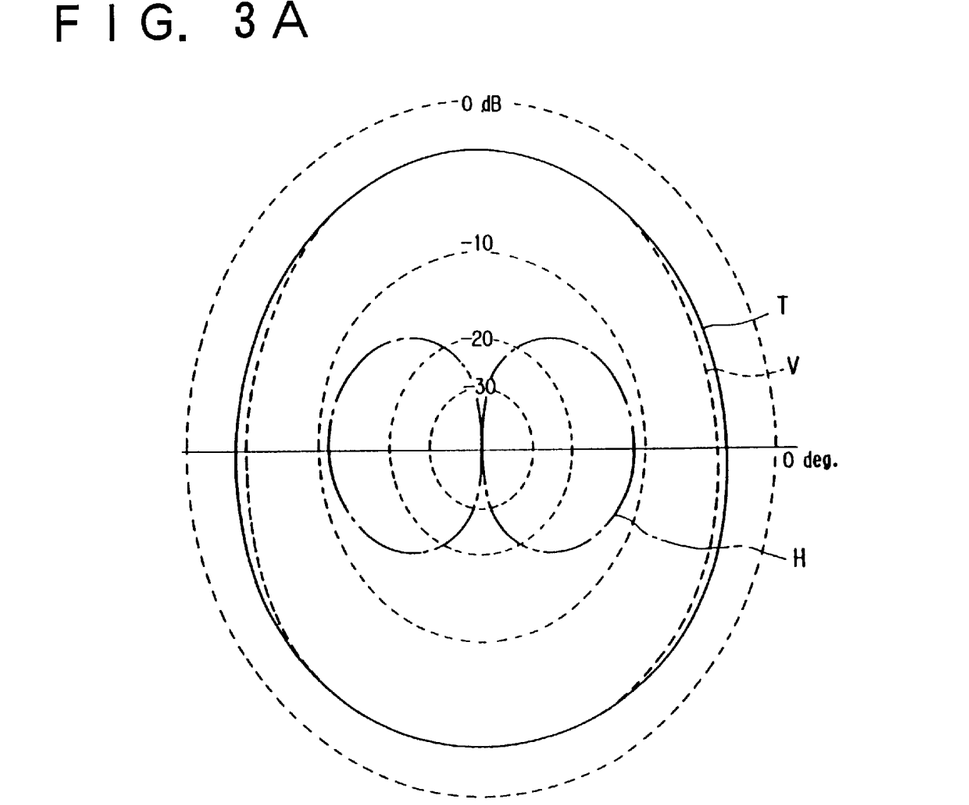
FIG. 3A is a horizontal plane view showing an equivalent circuit in the case where a horizontally positioned half-wavelength dipole antenna is separated from the circuit.
Figure 3B:
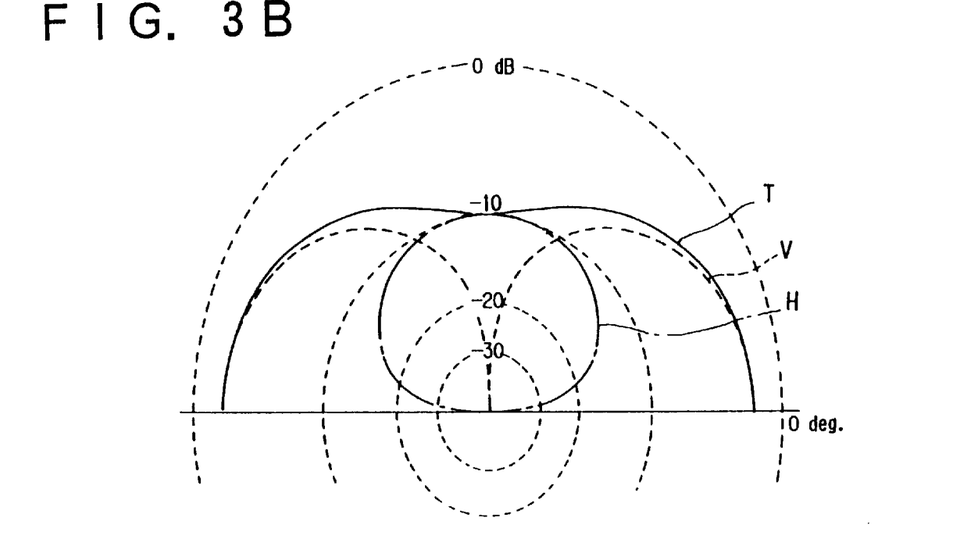
FIG. 3B is a field strength pattern showing orientation of a radiated electric field strength in a vertical plane.

When the horizontally positioned half-wavelength dipole antenna 102 is separated therefrom, the result of simulation according to FIG. 2A is shown in FIG. 3. Each of FIG. 3A and FIG. 3B is a field strength pattern, and FIG. 3A shows orientation of radiated electric field strength on a horizontal plane thereof, while FIG. 3B shows that on a vertical plane thereof.

In FIGS. 3A and 3B, the field strength pattern (V in the figure) of the vertically positioned ¼ wavelength whip antenna 101 is dominant as compared with that (H in the figure) of the horizontally positioned half-wavelength dipole antenna 102, so that it can be said that receiving by the vertically positioned ¼ wavelength whip antenna 101 is hardly affected by the horizontally positioned half-wavelength dipole antenna 102. With this feature, it is understood that, when the horizontally positioned half-wavelength dipole antenna 102 is separated, the impedance at the feeding point may be set to 100 Ω or more.

Figure 4A:
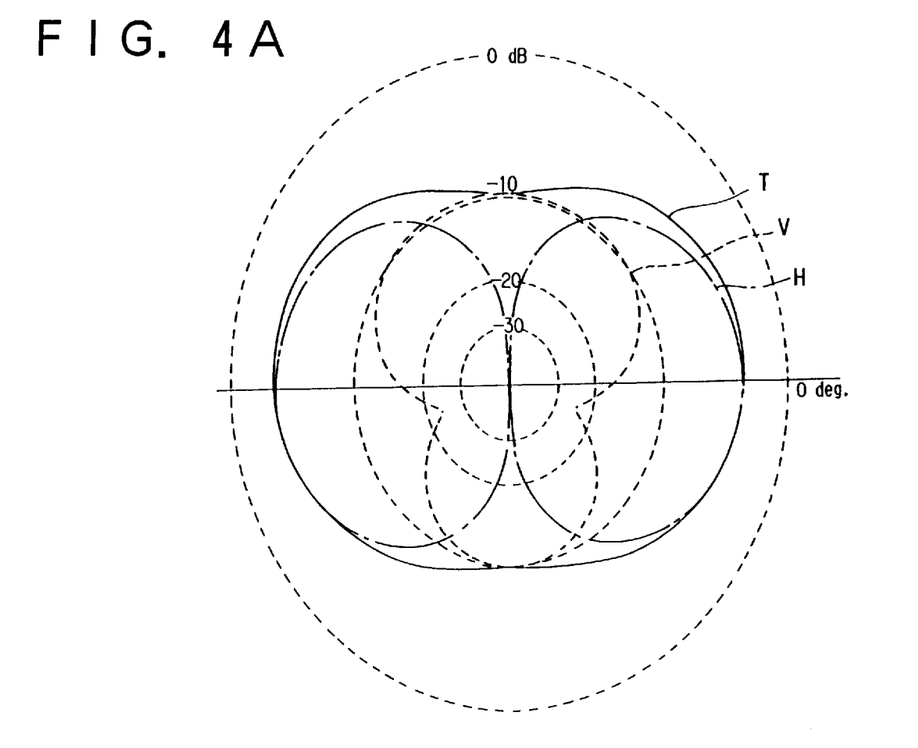
FIG. 4A is a horizontal plane view of a wavelength in the case where the vertically positioned ¼ wavelength whip antenna is separated from the circuit.
Figure 4B:
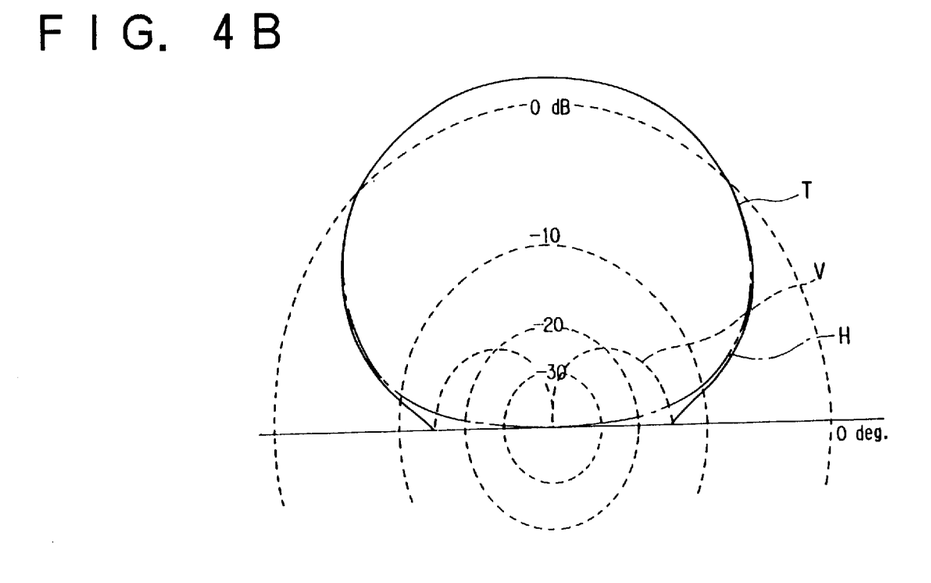
FIG. 4B is a field strength pattern showing orientation of a radiation electric field strength in a vertical plane.

When the vertically positioned ¼ wavelength whip antenna 101 is separated, the result of simulation of FIG. 2B is as shown in FIG. 4. Each of FIG. 4A and FIG. 4B shows a field strength pattern, and FIG. 4A shows orientation of radiated electric field strength on a horizontal plane thereof, while FIG. 4B shows that on a vertical plane thereof.

In FIGS. 4A and 4B, the field strength pattern (H in the figure) of the horizontally positioned half-wavelength dipole antenna 102 is dominant as compared with that (V in the figure) of the vertically positioned ¼ wavelength whip antenna 101, so that it can be said that receiving by the horizontally positioned half- wavelength dipole antenna 102 is hardly affected by the vertically positioned ¼ wavelength whip antenna 101. With this feature, it is understood that, when the vertically positioned ¼ wavelength whip antenna 101 is separated, the impedance at the feeding point may be set to 100 Ω or more.

As described above, the switching control section comprises diodes 115 and 116, such as an HSU277, and a CPU 122, and the CPU 122 determines from the electric field strength of a received signal obtained by the CPU via the receiving circuit 121, and bias control for a regular direction/reverse direction to the diodes 115 and 116 is executed according to control signals 125 and 126 therefrom respectively.

Namely, the other end 132 of the ¼ wavelength first strip line 109 not connected to the vertically positioned ¼ wavelength whip antenna 101 is short/open-controlled according to a bias control for a regular direction/a reverse direction to the diode 115, and with this feature, when it is seen from the connection point 132, the connection point 131 between the vertically positioned ¼ wavelength whip antenna 101 and the ¼ wavelength first strip line 109, namely the feeding point of the vertically positioned ¼ wavelength whip antenna 101 is open/short-controlled, and also the connection point 133 between the ¼ wavelength second strip line 110 and the receiving circuit 121 is controlled for opening or shorting.

The other end 134 of the ¼ wavelength feeder line 108 comprising two lines in parallel to each other not connected to the horizontally positioned half-wavelength dipole antenna 102 is controlled for shorting or opening according to a bias control for a regular direction or a reverse direction to the diode 116. With this feature, when it is seen from the connection point 134, the connection point between the horizontally positioned half-wavelength dipole antenna 102 and the horizontally positioned half-wavelength dipole antenna 104, namely the feeding point of the horizontally positioned half-wavelength dipole antenna 102 is controlled for opening or shorting, and also the connection point 133 between the ¼ half-wavelength third strip line 111 and the receiving circuit 121 is controlled for opening or shorting.

When the CPU 122 determines from the electric field strength obtained by the receiving circuit 121 that an electric field strength of a signal received by the vertically positioned ¼ wavelength whip antenna 101 is higher than that by the horizontally positioned half-wavelength dipole antenna 102, the receiving system based on the horizontally positioned half-wavelength dipole antenna 102 is separated therefrom by reverse biasing to the diode 115 and forward biasing the diode 116, and also the receiving system based on the vertically positioned ¼ wavelength whip antenna 101 is connected thereto, whereby receiving operation is executed.

When the CPU 122 determines that an electric field strength of a signal received by the horizontally positioned half-wavelength dipole antenna 102 is higher than that in receiving by the vertically positioned ¼ wavelength whip antenna 101, the receiving system based on the ¼ wavelength whip antenna 101 is separated therefrom by forward biasing the diode 115 and a reverse biasing the diode 116, and also the receiving system based on the horizontally positioned half-wavelength dipole antenna 102 is connected thereto, whereby receiving operation is executed.

As described above, the matching means comprises a ¼ wavelength first strip line 109 for matching impedance of the vertically positioned ¼ wavelength whip antenna 101 to the switch section for switching described later and a ¼ wavelength feeder line 108 comprising two lines in parallel to each other having a first feeder line section 106 connected to the first conductor section 103 and a second feeder line section 107 connected to the second conductor 104 and for matching impedance of the horizontally positioned half-wavelength dipole antenna 102 to the switching section for switching.

Features required as a matching means for the diversity antenna circuit is, firstly, to match the impedance of the antenna to an output from the switch section for switching, and secondly, to make higher the impedance at the feeding point when separated therefrom.

The circuit satisfying these requests is a ¼ wavelength strip line. The impedance of the horizontally positioned half-wavelength dipole antenna 102 is 72 [Ω], and the impedance of the vertically positioned ¼ wavelength whip antenna 101 is 36 [Ω]. The output from the switch section may match the antenna impedance during passing through, and the impedance at the feeding point may be high when it is separated.

Here in the circuit features were checked by a simulation experiment with a simulator of "Touch stone" for designing of the matching means. As a result of the simulation experiment, a loss of 0.3 [dB] and isolation of 25 [dB] in a passing direction respectively were obtained. As for impedance, it was 76+j 18 [Ω] in the horizontally positioned half-wavelength dipole antenna 102, and it was 39+j 8 [Ω] in the vertically positioned ¼ wavelength whip antenna 101, and as for the impedance when separated, it was 1 [kΩ] or more when the horizontally positioned half-wavelength dipole antenna 102 was separated, and it was approx. 650 [Ω] when the vertically positioned ¼ wavelength whip antenna 101 was separated. It was recognized from the result of the testing described above that configuration of the matching means of the present embodiment was appropriate.

As for the matching means with the horizontally positioned half-wavelength dipole antenna 102, a ¼ wavelength strip line is realized with the ¼ wavelength feeder line 108 comprising two lines in parallel to each other. Namely, if configured with an identical impedance and two lines in parallel to each other with ¼ wavelength having the same length, these are equivalent to each other.

A packaging pattern view of the diversity antenna circuit of the present embodiment is shown in FIGS. 5A and 5B. FIG. 5A is a pattern view of the front surface of substrate 701, while FIG. 5B is a pattern view of the rear surface thereof.

In FIG. 5A, the vertically positioned ¼ wavelength whip antenna 101, second conductor section 104 of the horizontally positioned half-wavelength dipole antenna 102, second feeder line section 107 of the ¼ wavelength feeder line 108 comprising two lines in parallel to each other, ¼ wavelength first strip line 109, a ¼ wavelength second strip line 110, ¼ wavelength third strip line 111, diode 115, diode 116, and feeder line 123 to the receiving circuit 121 are packaged in a layer formed on the front surface of substrate 701. In FIG. 5B, the first conductor section 103 of the horizontally positioned half-wavelength dipole antenna 102, first feeder line section 106 of the ¼ wavelength feeder line 108 comprising two lines in parallel to each other, and a grand pattern 704 are packaged in a different layer formed on the rear surface of substrate 701. It should be noted that the reference numerals 702 and 703 each indicate a through hole.

Application of the circuit for an antenna for a mobile station requiring a high degree of miniaturization of a potable telephone unit or the like becomes possible by packaging the diversity antenna circuit on the circuit substrate as described above, and for this reason, a compact diversity antenna circuit suitable to incorporation in a portable unit can be realized.

Also, the first conductor section 103 as well as the first feeder line section 106 and the second conductor section 104 as well as second feeder line section 107 each constituting the half-wavelength dipole antenna 102 and ¼ wavelength feeder line 108 comprising two lines in parallel to each other are packaged in different layers. Thus, the width of these elements can be made larger, and losses can be reduced, and for this reason, a diversity antenna circuit with excellent performance can be realized at a wider frequency band.

As described above, with the diversity antenna circuit according to a first feature of the present invention, two receiving systems having no correlation between each other about a plane of polarization are provided therein. Fluctuation during propagation of electric wave is reduced by switching electric power received thereby with a switching means. More specifically, a plane of vertical polarization of electric wave is mainly received by the first antenna, a plane of horizontal polarization of electric wave is mainly received by the second antenna, an electric field strength of a received signal received by the first antenna and second antenna is detected by the receiving means, one end of the first antenna and second antenna each is connected to the receiving means by ON control or OFF control of the first switching means and the second switching means based on the electric field strength in the switching control means. The receiving means is separated from the other end of the first antenna and second antenna, impedance matching between the first antenna and the receiving means is executed by the first matching means, and impedance matching between the second antenna and the receiving means is executed by the second matching means. A diversity antenna circuit in which interference between each other in each of receiving operations can accordingly be suppressed and accurate selection of the antenna one having higher receiving sensitivity.

With the diversity antenna circuit according to a second feature of the present invention, the first antenna is a ¼ wavelength whip antenna installed in a vertical direction, the second antenna is a half-wavelength dipole antenna installed in a horizontal direction and including a ¼ wavelength first conductor section and a ¼ wavelength second conductor section. The first matching means is a ¼ wavelength first strip line having one end thereof connected to a feeding point of the ¼ wavelength whip antenna. The second matching means is a ¼ wavelength feeding line comprising two lines parallel to each other including a first feeder line section having one end thereof connected to a feeding point of the ¼ wavelength first conductor section and a second feeder line section having one end connected to a feeding point of ¼ wavelength second conductor section. The first transfer means is a ¼ wavelength second strip line connected to the other end of the ¼ wavelength first strip line, and the second transfer means is a ¼ wavelength third strip line connected to the other end of the first feeder line section or the second feeder line section. Thereby when a plane of vertical polarization of electric wave is received by the ¼ wavelength whip antenna and a plane of horizontal polarization is received by the half wavelength dipole antenna, the another having higher receiving sensitivity can be accurately selected and switched by the switching control means, and matching impedance between the first antenna as well as the second antenna and the receiving means can be executed without fail by the first matching means and the second matching means. In addition, impedance at feeding points each of the first antenna and the second antenna can be made higher when the first antenna and the second antenna are separated from the receiving means. For this reason, mutual interference in receiving operation in each of the receiving systems can be suppressed.

Also the circuit according to the second feature comprises the first transfer means through the ¼ wavelength strip line and the second transfer means through the ¼ wavelength third strip line. Flexible circuit design such that the strip line is set is possible so that a capacity component and an induction component with elements realizing the first switching means and the second switching means can be absorbed in the ¼ wavelength second strip line and the ¼ wavelength third strip line. Losses produced by connection thereof and separation therefrom can be reduced, and for this reason, a diversity antenna circuit with excellent performance described above can be realized.

With the diversity antenna circuit according to a third feature of the present invention, the switching control means turns OFF the first switching means and ON the second switching means when it determines that the electric field strength of a signal received by the first antenna is higher than that by the second antenna. The switching means turns ON the first switching means and OFF the second switching means when it determines that the electric field strength of a signal received by he second antenna is higher than that by the first antenna, so that the receiving system with the second antenna is separated from the circuit, the receiving system with the first antenna is connected thereto. Reception by the receiving system is executed when it is determined that the electric field received by the first antenna is higher, while the receiving system with the first antenna is separated from the circuit, the receiving system with the second antenna is connected thereto. Reception by the receiving system is executed when it is determined that the electric field in receiving with the second antenna is higher, thus selection and switching of a receiving system being executed without fail.

With the diversity antenna circuit according to a fourth feature of the present invention, a connection point between the first antenna and the first matching means is connected to or disconnected from a connection point between the first transfer means and the receiving means according to ON or OFF control by the first switching means, while a connection point between the second antenna and the second matching means is connected to and disconnected from a connection point between the second transfer means and the receiving means according to ON or OFF control by the second switching means, and the connection point between the first antenna and the first matching means. The feeding point of the first antenna is open/short-controlled according to ON/OFF control by the first switching means, while the connection point between the second antenna and the second matching means. The feeding point of the second antenna is open/short-controlled according to ON/OFF control by the second switching means, so that selection and switching of a receiving system by the switching control means can be executed without fail. Losses produced by connection thereto and separation therefrom can be reduced, and for this reason, a diversity antenna circuit with excellent performance described above can be realized.

Furthermore, with the diversity antenna circuit according to a fifth feature of the present invention, the diversity antenna circuit is packaged on a substrate, and the ¼ wavelength first conductor section as well as the first feeder line section and the ¼ wavelength second conductor section as well as the second feeder line section are packaged in different layers formed on the substrate, so that it is possible that the circuit is applied to an antenna for a mobile station required a high degree of miniaturization of a potable telephone unit or the like. A compact diversity antenna circuit suitable to incorporation in a potable unit can thus be realized. Also the width of elements can be made greater by packaging a half-wavelength dipole antenna and a ¼ wavelength feeder line comprising two lines in parallel to each other in different layers formed on the substrate, and losses can be reduced. For this reason, a diversity antenna circuit with excellent performance at a wider frequency band can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A diversity antenna circuit comprising:
    a first antenna for mainly receiving a vertically polarized electric wave;
    a second antenna for mainly receiving a horizontally polarized electric wave;
    a receiver for detecting an electric field strength of a signal received by said first antenna and said second antenna;
    a first matching circuit configured to match impedance of said first antenna to that of said receiver;
    a second matching circuit configured to match impedance of said second antenna to that of said receiver;
    a first transferring element having one end thereof connected to the end of said first matching circuit not connected to said first antenna and another end connected to said receiver;
    a second transferring element having one end thereof connected to the end of said second matching circuit not connected to said second antenna and another end thereof connected to said receiver;
    a first switch coupled between a connection point of said first matching circuit with said first transferring element and a ground voltage terminal;
    a second switch coupled between a connection point of said second matching circuit with said second transferring element and the ground voltage terminal; and
    a switch control circuit to control said first and second switches to connect said receiver to one of said first antenna and said second antenna and separating said receiver from another of said first antenna and said second antenna based on the electric field strength detected by said receiver.

2. The diversity antenna circuit according to claim 1, wherein said switch control circuit turns OFF said first switch and ON said second switch when it determines that the electric field strength when receiving with said first antenna is higher than that when receiving with said second antenna and also turns ON said first switch and OFF said second switch when it determines that the electric field strength when receiving with said second antenna is higher than that when receiving with said first antenna.

3. The diversity circuit according to claim 1, wherein a connection point between said first antenna and said first matching circuit is connected to or disconnected from a connection point between said first transferring element and said receiver according to ON control or OFF control by said first switch, and a connection point between said second matching circuit is connected to or disconnected from a connection point between said second transferring element and said receiver according to ON control or OFF control by said second switch.

4. The diversity antenna circuit according to claim 1, wherein said first antenna is a ¼ wavelength whip antenna installed in a vertical direction;
    said second antenna is a half-wavelength dipole antenna installed in a horizontal direction and including a ¼ wavelength first conductor section and a ¼ wavelength second conductor section;
    said first matching circuit is a ¼ wavelength first strip line having one end thereof connected to a feeding point of said ¼ wavelength whip antenna;
    said second matching circuit is a ¼ wavelength feeder line comprising two lines parallel to each other and including a first feeder line section having one end thereof connected to a feeding point of said ¼ wavelength first conductor section and a second feeder line section having one end thereof connected to a feeding point of said ¼ wavelength second conductor section;
    said first transferring element is a ¼ wavelength second strip line connected to the other end of said ¼ wavelength first strip line; and
    said second transferring element is a ¼ wavelength third strip line connected to the other end of said first feeder line section or said second feeder line section.

5. The diversity antenna circuit according to claim 4, wherein said switch control circuit turns OFF said first switch and ON said second switch when it determines that the electric field strength when receiving with said first antenna is higher than that when receiving with said second antenna and also turns ON said first switching means and OFF said second switch when it determines that the electric field strength when receiving with said second antenna is higher than that when receiving with said first antenna.

6. The diversity circuit according to claim 4, wherein a connection point between said first antenna and said first matching circuit is connected to or disconnected from a connection point between said first transferring element and said receiver according to ON control or OFF control by said first switch, and a connection point between said second antenna and said second matching circuit is connected to or disconnected from a connection point between said second transferring element and said receiver according to ON control or OFF control by said second switch.

7. The diversity antenna circuit according to claim 4, wherein said diversity antenna circuit is packaged on a substrate and said first ¼ wavelength first conductor section and said first feeder line section, and said ¼ wavelength second conductor section and said second feeder line section are packaged in different layers formed on the substrate.

8. A system for reducing fading of received signals, comprising:

first and second antennas for receiving first and second waves polarized in first and second planes, respectively;

a receiving circuit coupled to said first and second antennas for detecting intensity of the received waves;

a first switch coupled to said first antenna and having a first state for connecting said first antenna to said receiving circuit, and a second state for separating said first antenna from said receiving circuit;

a second switch coupled to said second antenna and having a first state for connecting said second antenna to said receiving circuit, and a second state for separating said second antenna from said receiving circuit; and a switch control circuit coupled to said first and second switches and responsive to said receiving circuit for setting said first and second switches into the first and second states, respectively, when the intensity of the first wave is higher than the intensity of the second wave, and for setting said first and second switches into the second and first states, respectively, when the intensity of the first wave is lower than the intensity of the second wave.

9. The system of claim 8, wherein each of said first and second switches comprises a diode controlled by said switch control circuit.

10. The system of claim 8, wherein said first antenna comprises a vertically positioned quarter-wavelength whip antenna, and said second antenna comprises a horizontally positioned half-wavelength dipole antenna.

* * * * *